United States Patent
Hund et al.

(10) Patent No.: US 9,546,246 B2
(45) Date of Patent: Jan. 17, 2017

(54) COMPLEXES OF WATER-SOLUBLE POLYMERS, AND USES THEREOF

(71) Applicant: S.P.C.M. SA, Andrezieux Boutheon (FR)

(72) Inventors: René Hund, Villars (FR); Gatien Faucher, Saint Etienne (FR); Damien Fougerousse, Sorbiers (FR)

(73) Assignee: S.P.C.M. SA, Andrezieux Boutheon (FR)

(*) Notice: Subject to any disclaimer, the term of this patent is extended or adjusted under 35 U.S.C. 154(b) by 0 days.

(21) Appl. No.: 14/340,089

(22) Filed: Jul. 24, 2014

(65) Prior Publication Data
US 2015/0053361 A1   Feb. 26, 2015

(30) Foreign Application Priority Data
Aug. 22, 2013   (FR) .................................... 13 58119

(51) Int. Cl.
| C08G 73/02 | (2006.01) |
| D21H 17/37 | (2006.01) |
| C08L 39/00 | (2006.01) |
| D21H 21/10 | (2006.01) |
| C08F 265/10 | (2006.01) |

(52) U.S. Cl.
CPC ............ *C08G 73/02* (2013.01); *C08F 265/10* (2013.01); *C08L 39/00* (2013.01); *D21H 17/375* (2013.01); *D21H 21/10* (2013.01)

(58) Field of Classification Search
CPC ......... C08F 271/00; C08G 73/02; C08L 39/00
See application file for complete search history.

(56) References Cited

U.S. PATENT DOCUMENTS

| 5,110,883 A * | 5/1992 | Gartner ........................... 526/84 |
| 7,001,953 B2 | 2/2006 | Chen et al. |
| 2002/0188040 A1 | 12/2002 | Chen et al. |

FOREIGN PATENT DOCUMENTS

WO   2006/071961 A1   7/2006

* cited by examiner

*Primary Examiner* — Irina S Zemel
*Assistant Examiner* — Jeffrey Lenihan
(74) *Attorney, Agent, or Firm* — Heslin Rothenberg Farley & Mesiti P.C.

(57) ABSTRACT

Polymer complex obtained by polymerization of water-soluble monomers: in the presence of a host polymer comprising vinylamine functions and of a non-polymeric transfer agent, and in the absence of branching or crosslinking agent of ethylenic polyfunctional type.

18 Claims, No Drawings

COMPLEXES OF WATER-SOLUBLE POLYMERS, AND USES THEREOF

CROSS REFERENCE TO RELATED APPLICATIONS

This application claims priority to French Application No. 1358119 filed on Aug. 22, 2013, the entire disclosure of which is hereby incorporated herein by reference.

FIELD OF THE INVENTION

The present invention relates to a complex of water-soluble polymers derived from the polymerization of one or more water-soluble monomers.

Another aspect of the invention relates to the use of this complex as an agent for treating mineral fillers and especially for their use in the manufacture of paper, cardboard or the like.

PRIOR ART

In the field of papermaking, cellulose fibres are placed in aqueous suspension before being deposited on a gauze so as to form the sheet of paper, which is then drained and dried. Mineral fillers are also added to this suspension of cellulose fibres for the purpose especially of improving the optical properties of the paper. The retention of these fillers is generally increased by adding one or more polymeric agents.

Examples that may be mentioned include the Optifill system (Ashland) using a system comprising an amphoteric polymer (DADMAC/acrylic acid), the Luredur system (BASF) using a single amphoteric polymer comprising vinylamine functions.

Techniques of sequential addition of several polymers at various points also exist. This is, for example, the Fillertek system (Nalco), which comprises a system of two flocculants added separately.

These techniques however comprise logistical drawbacks due to the different metering of the polymers and to their separate additions.

Other polymers may also be introduced into the cellulose suspension in order to improve the properties of the sheet of paper. However, the introduction of polymers of different molecular weights may prove to be problematic.

Specifically, the difficulties associated with the preparation of a homogeneous composition containing two polymers with different molecular weights are known to those skilled in the art.

On account of this difference in molecular weight, phase separation may appear during the dissolution of these polymers.

Those skilled in the art thus developed polymerization methods thus making it possible to overcome the problem of phase separation.

For example, patents U.S. Pat. No. 7,001,953 and U.S. Pat. No. 8,021,516 describe water-soluble polymers which may be used in the treatment of sludges and in the manufacture of paper. These polymers are obtained by polymerization of monomers in the presence of a polymer that has been prepared beforehand and independently. As indicated in the said documents, the presynthesized polymer and the polymer undergoing synthesis substantially do not undergo grafting.

What is in fact involved is the formation of an intercalated polymer in the presence of a host polymer. The host polymer is not grafted during the polymerization of the monomers, which may be performed in the presence of a branching agent. This process thus makes it possible to obtain a mixture of two different, intercalated polymers. This intercalated polymer structure makes it possible to obtain properties different from those resulting from a mixture of non-intercalated polymers.

One of the problems that the Applicant proposes to solve is that of developing a novel complex of water-soluble polymers that does not show any phase separation, i.e. a homogeneous mixture of interconnected polymers.

Another aspect of the invention relates to a novel agent for treating mineral fillers used in the manufacture of paper, cardboard or the like.

Specifically, papermakers are seeking to increase the amount of fillers so as to improve the optical properties of the sheet such as the opacity or the whiteness. Now, the products of the prior art are not entirely satisfactory.

DESCRIPTION OF THE INVENTION

The present invention relates to a complex of polymers comprising a water-soluble polymer (host polymer) and one or more water-soluble monomers polymerized in the presence of the said water-soluble host polymer.

More precisely, a subject of the present invention concerns a complex of polymers obtained by polymerization of water-soluble monomers in the presence of at least one water-soluble host polymer comprising vinylamine functions and of at least one non-polymeric transfer agent and in the absence of a branching or crosslinking agent of ethylenic polyfunctional type.

In the complex thus obtained, the polymer(s) resulting from the polymerization of the monomers branches with the host polymer. Unlike the polymers described in U.S. Pat. No. 7,001,953, it is not a mixture of polymers, but a complex in which the host polymer acts as crosslinking or branching agent, during the polymerization of the monomers.

The transfer agent makes it possible especially to limit the crosslinking associated with the host polymer and to control the length of the polymer chains formed during the polymerization of the water-soluble monomers. In contrast, the mixture of polymers described in U.S. Pat. No. 7,001,953 is obtained in the absence of a transfer agent. The difference between the polymer complex according to the present invention and a mixture of complexes obtained in the absence of a transfer agent in accordance with U.S. Pat. No. 7,001,953 is illustrated hereinbelow.

The term "polymer" means a homopolymer or a copolymer derived from the polymerization of monomers, which may be identical or different, respectively.

Another aspect of the invention is the use of this complex of water-soluble polymers as an agent for treating mineral fillers intended for manufacturing paper, cardboard or the like.

Host Polymer

The host polymer preferentially comprises vinylamine functions, i.e. of polyvinylamine type.

The host polymer comprising vinylamine functions may be derived from various processes known to those skilled in the art. It may especially be:

a polymer derived from Hofmann degradation on a "base polymer", or a polymer derived from the total or partial hydrolysis of an N-vinylformamide homopolymer or copolymer.

Polyvinylamines Derived from Hofmann Degradation

Hofmann degradation is a reaction that was discovered by Hofmann at the end of the nineteenth century, which makes it possible to convert an amide (or even an acrylonitrile) into a primary amine by removal of carbon dioxide. The reaction mechanism is detailed below.

In the presence of a base (sodium hydroxide), a proton is stripped from the amide.

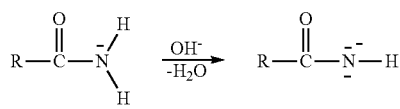

The amidate ion formed then reacts with the active chlorine ($Cl_2$) of hypochlorite (NaClO which is in equilibrium: $2\ NaOH+Cl_2 \Leftrightarrow NaClO+NaCl+H_2O$) to give an N-chloramide. The base (NaOH) strips a proton from the chloramide to form an anion. The anion loses a chloride ion to form a nitrene, which undergoes rearrangement to an isocyanate.

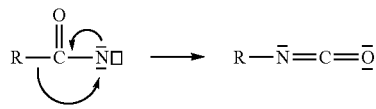

By reaction between the hydroxide ion and the isocyanate, a carbamate is formed.

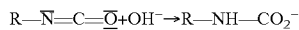

After decarboxylation (removal of $CO_2$) from the carbamate, a primary amine is formed:

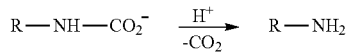

For the conversion of all or some of the amide functions of a polymer into amine functions, two main factors are involved (expressed as mole ratios). These are:
- alpha=(alkali metal and/or alkaline-earth metal hypohalide/amide),
- beta=(alkali metal and/or alkaline-earth metal hydroxide/alkali metal and/or alkaline-earth metal hypohalide).

According to a preferential mode, the polymer comprising vinylamine functions is derived from Hofmann degradation performed on a "base polymer" comprising a nonionic monomer chosen from the group comprising acrylamide or a derivative thereof.

Among the acrylamide derivatives, mention may be made of N-isopropylacrylamide, N,N-dimethylacrylamide or methacrylamide. The preferred monomer is acrylamide.

According to the invention, the proportion of acrylamide monomer or derivatives in the "base polymer" is between 30 mol % and 100 mol %, preferably between 50 mol % and 95 mol % and even more preferentially between 60 mol % and 90 mol %, relative to the total number of monomers in the "base polymer".

The "base polymer" may also contain cationic and/or anionic monomers.

The cationic monomer(s) that may be used in the context of the invention may be chosen especially from quaternary ammonium salts of monomers of the acrylamide, acrylic, vinyl, allylic or maleic type. Mention may be made, in particular and in a non-limiting manner, of quaternized dimethylaminoethyl acrylate (DMAEA), quaternized dimethylaminoethyl methacrylate (DMAEMA), dimethyldiallylammonium chloride (DADMAC), acrylamidopropyltrimethylammonium chloride (APTAC) and methacrylamidopropyltrimethylammonium chloride (MAPTAC). A preferred cationic monomer is DADMAC.

According to the invention, the proportion of cationic monomer in the "base polymer" is between 0 mol % and 99 mol %, preferably between 5 mol % and 50 mol % and even more preferentially between 10 mol % and 40 mol %, relative to the total number of monomers in the "base polymer".

The anionic monomer(s) that may be used in the context of the invention may be chosen from a broad group. These monomers may bear acrylic, vinyl, maleic, fumaric or allylic functions and may contain a carboxylate, phosphonate, phosphate, sulphate or sulfonate group or another group bearing an anionic charge. The monomer may be acidic or alternatively in the form of a corresponding alkaline-earth metal, alkali metal or ammonium salt of such a monomer. Examples of suitable monomers include acrylic acid, methacrylic acid, itaconic acid, crotonic acid, maleic acid, fumaric acid and monomers of strong acid type bearing, for example, a function of sulfonic acid or phosphonic acid type such as 2-acrylamido-2-methylpropanesulfonic acid, vinylsulfonic acid, vinylphosphonic acid, allylsulfonic acid, allylphosphonic acid, styrenesulfonic acid, and the water-soluble alkali metal, alkaline-earth metal and ammonium salts of these monomers. A preferred monomer is acrylic acid.

According to the invention, the proportion of anionic monomer in the "base polymer" is between 0 mol % and 99 mol %, preferably between 2 mol % and 50 mol % and even more preferentially between 5 mol % and 30 mol % relative to the total number of monomers in the "base polymer".

According to the invention, the alpha factor of the host polymer is advantageously between 0.1 and 1, preferably between 0.3 and 0.9 and even more preferentially between 0.5 and 0.8.

According to another mode of the invention, it is possible to use polyvinylamines obtained by Hofmann degradation performed on a polymer comprising acrylamide or derivatives thereof, and at least one polyfunctional compound containing at least 3 heteroatoms chosen from N, O, S and P, each bearing at least one labile hydrogen. The incorporation of the polyfunctional compound is performed before or during the polymerization of the constituent monomers of the "base polymer".

Preferentially, the polyfunctional compound is chosen from the group comprising polyethyleneimine, polyamine and polyallylamine.

Polyvinylamines Derived from the Total or Partial Hydrolysis of an N-Vinylformamide Polymer In a first step, an N-vinylformamide (NVF) polymer is obtained, NVF bearing the following unit:

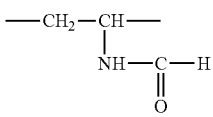

Thereafter, this NVF unit is converted, by hydrolysis, into vinylamine:

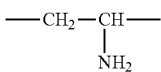

The hydrolysis may be performed via the action of acid (acidic hydrolysis) or of base (basic hydrolysis).

Depending on the amount of acid or base added, the NVF polymer is partially or totally converted into vinylamine.

Advantageously, the degree of hydrolysis is between 1% and 100% and even more advantageously between 30% and 90%. In other words, 30 to 90 NVF groups are converted into amine groups per 100 starting NVF groups.

Preferentially, the N-vinylformamide (NVF) polymer comprises at least one nonionic monomer and/or at least one cationic monomer and/or at least one anionic monomer. The monomers that may be used in the context of the invention may be chosen from the lists mentioned above.

Besides the vinylamine monomer, according to a preferential embodiment, the host polymer comprises at least one nonionic monomer and at least one cationic monomer. Preferentially, the polymer comprises acrylamide and DADMAC.

According to a preferred characteristic of the invention, the host polymer may be branched.

The branching is preferably produced during (or optionally after) the polymerization of the monomers constituting the host polymer, in the presence of a polyfunctional branching agent and optionally of a transfer agent.

A non-limiting list of branching agents will be found hereinbelow: methylenebisacrylamide (MBA), ethylene glycol diacrylate, polyethylene glycol dimethacrylate, diacrylamide, cyanomethyl acrylate, vinyloxyethyl acrylate or methacrylate, triallylamine, formaldehyde, glyoxal, compounds of glycidyl ether type such as ethylene glycol diglycidyl ether, or epoxy compounds.

In practice, the branching agent is advantageously introduced in a proportion of from five to fifty thousand (5 to 50 000) parts per million by weight relative to the active material (weight of monomers constituting the host polymer), preferably from 5 to 10 000 ppm and advantageously from 5 to 5000 ppm. Advantageously, the branching agent is methylenebisacrylamide (MBA).

Transfer agents for limiting the length of the polymer chains may also be present during the polymerization of the monomers constituting the host polymer. A non-limiting list of transfer agents will be found hereinbelow: isopropyl alcohol, sodium hypophosphite, mercaptoethanol.

According to the invention, the host polymer has a molecular weight of at least 10 000 g/mol, preferably of at least 50 000 g/mol and even more preferentially of at least 100 000 g/mol.

Water-Soluble Polymer Complex

This is derived from the polymerization of water-soluble monomers, during which the pre-existing host polymer acts as a crosslinking or branching agent.

The water-soluble monomer(s) used during the preparation of the water-soluble polymer complex may especially be a nonionic monomer and/or at least one anionic monomer and/or at least one cationic monomer.

As already indicated, this polymerization is performed in the presence of at least one non-polymeric transfer agent whose molecular weight is advantageously less than 200 g/mol. In addition, the polymerization of the monomers is also performed in the absence of a branching or crosslinking agent of ethylenic polyfunctional type.

The term "branching or crosslinking agent of ethylenic polyfunctional type" denotes agents comprising a difunctional, trifunctional or tetrafunctional polyvinyl or polyallylic group.

At least one non-polymeric transfer agent used during the polymerization of the water-soluble monomer(s) is advantageously chosen from the group comprising isopropyl alcohol, sodium hypophosphite and mercaptoethanol.

The amount of transfer agent introduced is advantageously between 1 and 15 000 ppm, preferentially between 10 and 10 000 ppm and more preferentially between 100 and 5000 ppm by weight relative to the weight of the water-soluble monomers used.

The various monomers used may be chosen from the respective lists mentioned previously in the description of the host polymer.

According to the invention, the proportion of water-soluble monomers used is advantageously the following, relative to the total number of water-soluble monomers used:

- 1 mol % to 99 mol % of nonionic monomer, preferably between 40 mol % and 99 mol % and even more preferentially between 60 mol % and 98 mol %; and/or
- 0 to 99 mol % of anionic monomer, preferably between 1 mol % and 40 mol % and even more preferentially between 1 mol % and 20 mol %; and/or
- 0 to 99 mol % of cationic monomer, preferably between 1 mol % and 40 mol % and even more preferentially between 1 mol % and 20 mol %;

the total number of water-soluble monomers representing 100%.

According to a preferential mode, at least one nonionic monomer and at least one anionic monomer are used. They are preferentially acrylamide and acrylic acid.

The complexes of the present invention differ especially from the prior art in the presence of at least one non-polymeric transfer agent during the polymerization of the water-soluble monomers in the presence of the host polymer. Specifically, the presence of the transfer agent makes it possible to limit the crosslinking of the polymer resulting from the polymerization of the water-soluble monomers with the host polymer, while at the same time controlling the molecular weight of the polymer chains formed.

The mass ratio between the host polymer and the monomers is advantageously between 0.01 and 4, preferably between 0.05 and 1 and even more preferentially between 0.1 and 0.5.

In general, the preparation of the polymer complex of the invention does not require any particular polymerization process development. Specifically, this complex may be obtained according to any polymerization technique that is well known to those skilled in the art. It may especially be solution polymerization; gel polymerization; precipitation polymerization; emulsion (aqueous or inverse) polymerization; suspension polymerization; or micellar polymerization.

The process for preparing the polymer complex may comprise the following steps:

preparation of a mixture comprising at least one host polymer, water-soluble monomers and at least one non-polymeric transfer agent;
production of the polymer complex by polymerization of the water-soluble monomers.

The process for preparing the polymer complex may comprise the following steps:
preparation of a mixture comprising at least one host polymer, and at least one non-polymeric transfer agent;
water-soluble monomers are added by pouring continuously into the mixture;
production of the polymer complex by polymerization of the water-soluble monomers.

The process for preparing the polymer complex may comprise the following steps:
preparation of a mixture comprising at least one host polymer,
water-soluble monomers and at least one non-polymeric transfer agent are added by continuously pouring into the mixture;
production of the polymer complex by polymerization of the water-soluble monomers.

The process for preparing the polymer complex may comprise the following steps:
at least one host polymer, water-soluble monomers and at least one non-polymeric transfer agent are added by continuously pouring into the reactor;
production of the polymer complex by polymerization of the water-soluble monomers.

The water-soluble polymer complex may be in powder, liquid or emulsion form. Preferentially, the complex is in solution form.

Preferentially, during the preparation of the complex, the host polymer is introduced into the reactor with the monomers and the non-polymeric chain-transfer agent. The polymerization is then initiated by adding catalysts.

Another aspect of the invention is the use of the water-soluble polymer complexes as agents for treating mineral fillers intended for manufacturing paper, cardboard or the like.

It has been found, surprisingly, that the use of the complexes of the invention as agents for treating mineral fillers makes it possible to greatly improve the retention of the fillers during the manufacture of paper, cardboard or the like.

Without wishing to put forward any theory, it would appear that the grafting of the polymer resulting from the polymerization of the water-soluble monomers to the host polymer makes it possible to obtain products that have improved performance qualities as agents for treating mineral fillers.

The mineral filler(s) that may be treated are advantageously chosen from precipitated calcium carbonate (PCC), natural calcium carbonate (GCC), kaolin, titanium dioxide, silica, silicate and aluminium trihydrate. Preferably, the mineral filler to be treated is PCC.

The addition of the complex is performed with the conventional means known to those skilled in the art. The complex may be directly mixed with the slurry of mineral fillers. Preferably, the complex is introduced before the mixing pump (fan pump). More preferentially, the complex is added to the slurry pipe before introduction into the paper pulp.

The complex may be used in the form of a diluted or undiluted aqueous solution.

The amount of complex added is between 3 g of active material/tonne of paper and 10 000 g/T, preferentially between 10 g/T and 3000 g/T and even more preferentially between 30 g/T and 1000 g/T.

In addition to the complex, other compounds known to those skilled in the art may be combined. Mention may be made in a non-limiting manner of dispersants, biocides or antifoams.

The process for manufacturing paper, cardboard or the like, according to the invention, may comprise the following steps, on a paper machine:
placing cellulose fibres in aqueous suspension;
addition of mineral fillers to the aqueous suspension of cellulose fibres, said fillers having been pretreated with the branched polymer complex that is the subject of the invention;
formation of a sheet of paper, cardboard or the like on the gauze of the paper machine;
drying of the sheet.

This process may also comprise the addition of polymers other than the complex according to the invention. Examples that may be mentioned include coagulants, retention agents, flocculants or starch.

The various steps of the process for manufacturing paper, cardboard or the like are in accordance with the techniques involving the knowledge of a person skilled in the art.

The examples below illustrate the invention without, however, limiting it.

ILLUSTRATIVE EXAMPLES OF THE INVENTION

Synthesis of a Polymer Complex According to the Invention (Example N)

533 g of host polymer (HF31 commercial product (SNF floerger), active material=10.5%, solids=21%) referred to in the examples as X1, are introduced into a 1-liter reactor equipped with a mechanical stirrer, a thermometer, a condenser and a nitrogen gas dip tube. 416 g of 50% acrylamide (solution at 50% by weight) and 17.6 g of 90% acrylic acid (solution at 90% by weight) and also 0.58 g of chain-transfer agent (mercaptoethanol) are added. The temperature is adjusted to 20° C. and the catalysts are then injected into the reaction medium, i.e. 4.04 g of sodium persulfate and 0.026 g of Möhr's salt. By means of the reaction exothermicity, the temperature of the reaction medium rises to a temperature of 69.2° C. After 45 minutes of maturation, 2.5 g of sodium bisulfite (solution at 40% by weight) are added to react the possible residual monomers. Further maturation for 45 minutes is applied before cooling.

The complex solution obtained has a pH of 2.7, a solids content of 35.2% and a viscosity of 9600 cps (product N).

Synthesis of Polymer X2

557 g of deionized water, 401 g of 50% acrylamide (solution at 50% by weight) and 17 g of 90% acrylic acid (solution at 90% by weight) are introduced into a 1-liter reactor equipped with a mechanical stirrer, a thermometer, a condenser and a nitrogen gas dip tube. The temperature is adjusted to 30° C. 0.23 g of mercaptoethanol, 3.1 g of sodium persulfate and 0.02 g of Mohr's salt are then rapidly injected. By means of the reaction exothermicity, the temperature of the reaction medium rises to a temperature of 95° C. When the viscosity of the hot product is greater than 5000 cps, 2.5 g of 40% sodium bisulfite (solution at 40% by weight) are added to react with any residual monomers. After 45 minutes of maturation, the polymer is cooled to 25-30° C. and then neutralized with 15.3 g of 50% sodium hydroxide (solution at 50% by weight).

An anionic polymer with a pH of 6.2, a solids content of 22.7% and a viscosity of 9400 cps is obtained via this process.

Test Procedure for Evaluating the Total Retention and the Retention of Fillers

The various results were obtained by using a container of Britt Jar type, with a stirring speed of 1000 revolutions per minute.

The pulp used consists of a fibre mixture consisting of:
70% by weight of bleached hardwood kraft fibres,
10% by weight of bleached softwood kraft fibres,
20% by weight of pine-based mechanical pulp.

Fillers are subsequently added to the fibre mixture in a proportion of 30% of calcium carbonate optionally pre-treated with the product of the invention. The calcium carbonate is prepared in the form of a slurry at 20% by weight (aqueous composition).

The sequence of addition of the various components is the following:

T=0 s: stirring of 500 ml of pulp,
T=10 s: addition of the optionally pretreated calcium carbonate slurry,
T=20 s: addition of the main retention agent,
T=30 s: recovery of the 100 ml of white water.

The percentage first pass retention (% FPR) corresponds to the total retention calculated according to the following formula:

% FPR=$(C_{HB}-C_{WW})/C_{HB}\times 100$

The percentage first pass ash retention (% FPAR) corresponds to the total retention calculated according to the following formula:

% FPR=$(A_{HB}-A_{WW})/A_{HB}\times 100$ with:
$C_{HB}$: consistency of the headbox,
$C_{WW}$: consistency of the white water,
$A_{HB}$: consistency of the ash of the headbox,
$A_{WW}$: consistency of the ash of the white water.

The highest values obtained for the % FPR and the % FPAR correspond to the best performance qualities.

| Test No. | Product | Dose (g/t) | % FPAR |
|---|---|---|---|
| 0 | Blank | 0 | 26.2 |
| 1 | X1 | 300 | 27.4 |
| 2 | X2 | 300 | 29.5 |
| 3 | Mixture X1/X2(20/80 dry weight) | 300 | 42.8 |
| 4 | N (INVENTION) | 300 | 45.6 |
| 5 | Mixture C1/X2 (17.25/82.75 dry weight) | 300 | 42.3 |
| 6 | C2 | 300 | 39.5 |
| 7 | C3 | 300 | 40.4 |
| 8 | X3 | 300 | 39.8 |
| 9 | M | — | — |

(The expressed doses are amounts of dry polymer relative to the dry pulp)
X1: copolymer derived from the Hofmann degradation of a DADMAC/AM copolymer (30/70 mol %) with an alpha factor = 0.7 (corresponding to the host polymer of product N).
X2: AA/AM copolymer (7/93 mol %).
N: polymer according to the invention
C1: Xelorex RS 1200 (e.g. Luredur VH) from BASF. NVF/VA copolymer (50/50 mol %).
C2: Xelorex F3000 (e.g. V-Product 8358 X) from BASF. NVF/VA/AA copolymer (35/35/30 mol %).
C3: M5305 from Ashland. DADMAC/AA/AM copolymer (15/15/70 mol %).
X3: Polyamine/X2 (15/85% by dry weight) (the polyamine being branched and of the dimethylamine/ethylenediamine/epichlorohydrin type).
M: synthesized polymer such as the polymer N but without chain-transfer agent (mercaptoethanol).
VA = vinylamine
DADMAC = dimethyldiallylammonium chloride
AM = acrylamide
AA = acrylic acid
NVF = N-vinylformamide In all the tests, 200 g/t of an acrylamide/DMAEA MeCl copolymer (90/10) as main retention agent are added. (DMAEA MeCl=dimethylaminoethyl acrylate quaternized with methyl chloride).

It is noted in Tests 1 and 2 of the preceding table that the use of the host or secondary polymer alone affords virtually no filler retention performance relative to the reference test (blank).

The best filler retention performance qualities are obtained in Test 4, with the product N of the invention, which outclasses the prior art products C2 and C3 (Tests 6 and 7).

The mixtures X1/X2 and C1/X2 afford virtually equivalent performance qualities in terms of filler retention (Tests 3 and 5). However, in the maturation test (room temperature), we observe phase separation after one month for the mixture X1/X2 and after 15 days for the mixture C1/X2.

The product X3 (Test 8) corresponds to a secondary product as described in document U.S. Pat. No. 7,001,953. It does not afford the same level of filler retention performance as product N according to the invention (Test 4).

After the synthesis of the polymer M, a compact gel is obtained. Due to its consistency, polymer M could not be tested. This clearly demonstrates the advantage of the transfer agent for obtaining the polymer complex according to the invention. The absence of transfer agent in Example M is in accordance with the process for synthesizing the polymer mixture according to document U.S. Pat. No. 7,001,953.

The invention claimed is:

1. A polymer complex obtained by polymerization of water-soluble monomers in the presence of:
    a branching or crosslinking agent, which is a host polymer comprising vinylamine functions, and having a molecular weight of at least 10,000 g/mol; and of
    a non-polymeric transfer agent having a molecular weight of less than 200 g/mol,
    in the absence of branching agent of ethylenic polyfunctional type or crosslinking agent of ethylenic polyfunctional type,
    wherein the mass ratio between the host polymer and the monomers is from 0.01 to 4.

2. The polymer complex according to claim 1, wherein the non-polymeric transfer agent is chosen from the group consisting of isopropyl alcohol, sodium hypophosphite and mercaptoethanol.

3. The polymer complex according to claim 1, wherein the host polymer comprising vinylamine functions is derived from the hydrolysis of an N-vinylformamide homopolymer or copolymer.

4. The polymer complex according to claim 1, wherein the host polymer comprising vinylamine functions is derived from Hofmann degradation reaction on a base polymer.

5. The polymer complex according to claim 4, wherein the base polymer comprises at least one nonionic monomer chosen from the group consisting of acrylamide and derivatives thereof.

6. The polymer complex according to claim 4, wherein the base polymer comprises at least one polyfunctional compound containing at least 3 heteroatoms chosen from N, O, S and P, each bearing at least one labile hydrogen.

7. The polymer complex according to claim 6, wherein the polyfunctional compound is chosen from the group consisting of polyethyleneimine, polyamine and polyallylamine.

8. The polymer complex according to claim 1, wherein the constituent monomers of the host polymer and the water-soluble monomers are chosen from the group consisting of:
    acrylamide; N-isopropylacrylamide; N,N-dimethylacrylamide; N-vinylformamide; N-vinylpyrrolidone;
    quaternary ammonium salts of dimethylaminoethyl acrylate (DMAEA); quaternary ammonium salts of dimethylaminoethyl methacrylate (DMAEMA); dimethyldiallylammonium chloride (DADMAC); acrylamidopropyltrimethylammonium chloride (APTAC); methacrylamidopropyltrimethylammonium chloride (MAPTAC); and
    acrylic acid; methacrylic acid; itaconic acid; crotonic acid; maleic acid; fumaric acid; 2-acrylamido-2-methylpropanesulfonic acid; vinylsulfonic acid; vinylphosphonic acid; allylsulfonic acid; allylphosphonic acid; styrenesulfonic acid; water-soluble alkali metal, alkaline-earth metal or ammonium salts of these monomers.

9. The polymer complex according to claim 1, wherein the mass ratio between the host polymer and the monomers is from 0.05 to 1.

10. A process for preparing a polymer complex, said process comprising:
    preparing a mixture comprising: (i) at least one branching or crosslinking agent, which is a host polymer comprising vinylamine functions, and having a molecular weight of at least 10,000 g/mol; (ii) water-soluble monomers, and (iii) at least one non-polymeric transfer agent having a molecular weight of less than 200 g/mol, wherein the mass ratio between the host polymer and the monomers is from 0.01 to 4; and
    producing the polymer complex by polymerizing the mixture, wherein said polymerizing is performed in the absence of branching agent of ethylenic polyfunctional type or crosslinking agent of ethylenic polyfunctional type.

11. The process according to claim 10, wherein the non-polymeric transfer agent is chosen from the group consisting of isopropyl alcohol, sodium hypophosphite and mercaptoethanol.

12. The process according to claim 10, wherein the host polymer comprising vinylamine functions is derived from the hydrolysis of an N-vinylformamide homopolymer or copolymer.

13. The process according to claim 10, wherein the host polymer comprising vinylamine functions is derived from Hofmann degradation reaction on a base polymer.

14. The process according to claim 13, wherein the base polymer comprises at least one nonionic monomer chosen from the group consisting of acrylamide and derivatives thereof.

15. The process according to claim 13, wherein the base polymer comprises at least one polyfunctional compound containing at least 3 heteroatoms chosen from N, O, S and P, each bearing at least one labile hydrogen.

16. The process according to claim 15, wherein the polyfunctional compound is chosen from the group consisting of polyethyleneimine, polyamine and polyallylamine.

17. The process according to claim 10, wherein the constituent monomers of the host polymer and the water-soluble monomers are chosen from the group consisting of:
    acrylamide; N-isopropylacrylamide; N,N-dimethylacrylamide; N-vinylformamide; N-vinylpyrrolidone;
    quaternary ammonium salts of dimethylaminoethyl acrylate (DMAEA); quaternary ammonium salts of dimethylaminoethyl methacrylate (DMAEMA); dimethyldiallylammonium chloride (DADMAC); acrylamidopropyltrimethylammonium chloride (APTAC); methacrylamidopropyltrimethylammonium chloride (MAPTAC); and
    acrylic acid; methacrylic acid; itaconic acid; crotonic acid; maleic acid; fumaric acid; 2-acrylamido-2-methylpropanesulfonic acid; vinylsulfonic acid; vinylphosphonic acid; allylsulfonic acid; allylphosphonic acid; styrenesulfonic acid; water-soluble alkali metal, alkaline-earth metal or ammonium salts of these monomers.

18. A process for manufacturing paper or cardboard, comprising:
    placing cellulose fibres in aqueous suspension;
    adding mineral fillers to the aqueous suspension of fibres, the said fillers having been premixed with the polymer complex that is the subject of claim 1;
    forming a sheet of paper or cardboard on the gauze of the paper machine; and
    drying the sheet.

* * * * *